Aug. 6, 1963
R. W. McKIRDY
3,100,240
EXTENSIBLE ELECTRIC CONDUIT
Filed July 17, 1956
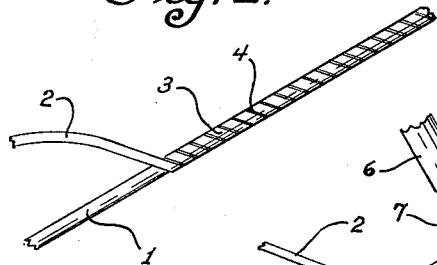
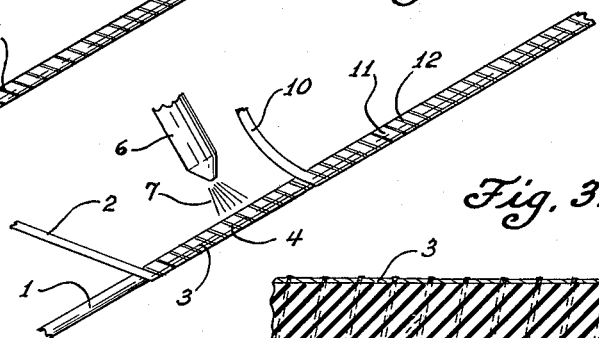
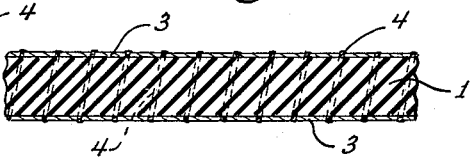
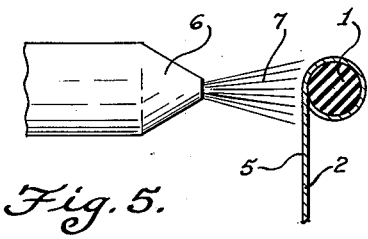
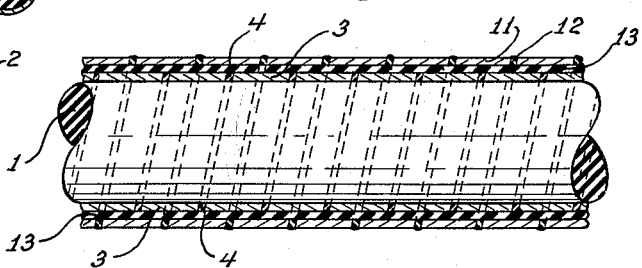
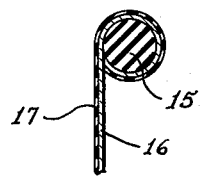
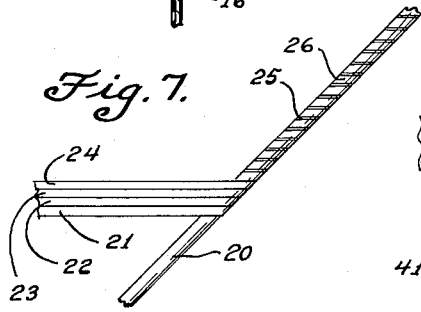
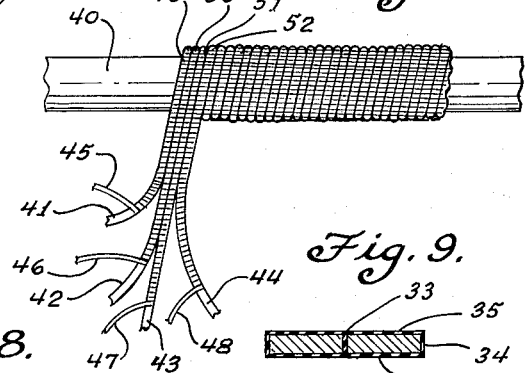
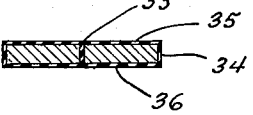
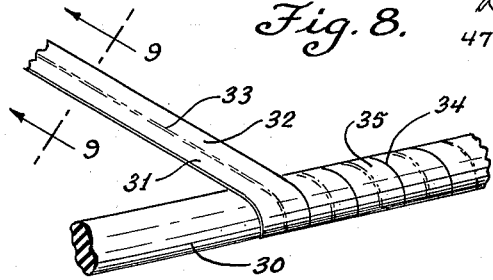
INVENTOR.
ROBERT W. McKIRDY
BY
Albert M. Parker
ATTORNEY.

United States Patent Office 3,100,240
Patented Aug. 6, 1963

3,100,240
EXTENSIBLE ELECTRIC CONDUIT
Robert W. McKirdy, Scarsdale, N.Y., assignor, by mesne assignments, of one-half to John W. Schmidt, Woodhaven, N.Y., and one-half to Robert W. McKirdy and Elizabeth C. McKirdy, Scarsdale, N.Y., as joint tenants
Filed July 17, 1956, Ser. No. 598,395
1 Claim. (Cl. 174—69)

This invention relates to an extensible and flexible electric conduits and methods of forming the same and is particularly concerned with improvements in the economy and current carrying capacity of such conduits.

Flexible electrical conduits as heretofore proposed generally involved the weaving or braiding of conductor elements to form a tubular conductor for electric current. Such prior proposals have principally been concerned with the furnishing of conduits limited to single conductors and without much regard to cost in respect of both material and manufacture. Furthermore, such conduits, though having reasonable physical strength, would carry little current and were limited in length by their construction so had a limited field of use. Demand has arisen, however, for economical conduits of considerable extensibility, of the multi-conductor type, of relatively unlimited length and capable of carrying considerable electrical current. The conduit of the invention and the method of forming the same meet this demand and do so in the manner that satisfies all the requirements.

The conduit of the invention is capable of being formed quickly and cheaply without any particular length limitations and without restriction on the use of the conductive materials employed. Though capable of being formed by using less and cheaper materials than the braided conductors of the prior art, the conduit of the invention nevertheless has an extensibility which is in excess of anything in the prior art and, though of lighter construction than anything heretofore proposed, has substantial life. Furthermore, the conduit of the invention can be formed quickly and cheaply in multiple conductor co-axial layers, insulated from one another. Importantly, the invention contemplates the formation of such conduits either in multiple conductor co-axial form or multiple parallel form for carrying sufficient current to be used for power transmission in addition to uses where the transmission of less current is contemplated. Finally, the formation is such that attachment of connectors at the ends of the conduits can be done in simple, straightforward manner.

It is accordingly an object of this invention to provide economical extensible electric conduits or cables.

Another object is to provide such conduits with greater extensibility than has heretofore been contemplated.

Another object is to provide such conduits with increased current carrying capacity.

Still another object is to provide for the insulation of conductors of such conduits in simple economical manner.

A further object is to provide for the forming of such conduits out of light-weight conductive material so as to greatly reduce the weight of electric conduits.

A further object is to provide methods for the formation of conduits as in the foregoing.

A more detailed object is to provide for the use of aluminum as the conductive material in the forming of such conduits.

Further and more detailed objectives of the invention will in part be obvious and in part be pointed out as the disclosures of the invention, taken in conjunction with the accompanying drawing, proceeds.

FIG. 1 shows an extensible electrical cable embodying a single conductor;

FIG. 2 shows an extensible coaxial cable;

FIG. 3 is a longitudinal sectional view of the cable of FIG. 1;

FIG. 4 shows a method of applying an insulating coating on the cable of FIG. 1;

FIG. 5 shows an extensible cable embodying a preinsulated conductor strip;

FIG. 6 is a longitudinal sectional view of the coaxial cable of FIG. 2;

FIG. 7 shows an extensible cable embodying a plurality of wound conductive strips;

FIG. 8 is a modification of the invention illustrated in FIG. 7 embodying a plurality of parallel wound preinsulated conductive strips;

FIG. 9 is a cross-sectional view taken along line 9—9 of FIG. 8 and

FIG. 10 shows an extensible cable having substantial strength and extensibility.

Generally speaking, the invention contemplates the formation of extensible and flexible conduits, of single or multiple conductors, resistant to vibration or shock which are formed by the helical serving of conductor material, particularly such material in flat strip form, on suitable extensible cores. The conduits are without limitation as to length and include simple, effective, insulation as needed. Furthermore, the conductors of the invention are provided in a manner to save considerable material over that needed in prior art conductors. Thus economies are introduced even in the use of such conductive material as silver and copper. The conductors of the invention go further, however, and open up the field to the use of aluminum with consequent saving in cost and weight with only a small increase in volume for equivalent current carrying capacity. Thus the invention will be described from the standpoint of employing aluminum for the conductive material though it is of course understood that it is by no means limited thereby.

Considering then the single conductor conduit illustrated in FIGS. 1 and 3, the conduit is shown as composed of a core 1 of extensible flexible material which may be made of any suitable material of which rubber, rubber like materials, neoprene and silicone rubber are examples. This core has a thin strip of aluminum served thereon in the form of a helix. The aluminum strip may be given an insulation coating throughout before application to the core if desired. However, aluminum is not acted upon by rubber, or other suitable core materials, in the same manner as copper would be so that in the form here being considered, uncoated strip aluminum 2 is wound or served right on to the core 1. Again, if this is to be the only winding applied, and particularly if the current to be transmitted is not particularly great, there is no necessity for having insulation between the turns 3 of the aluminum. However, it is preferable to furnish such insulation in the event that it is needed.

The furnishing of insulation between the turns 3 of the strip material can be provided in a most simple and effective manner. This is achieved by the tight serving of the helical windings on to the core in slightly spaced relation while the core material, or at the least a layer adjacent to the outer surface thereof, is somewhat fluid. Thus as illustrated at 4 in FIG. 1, and in enlarged form in FIG. 3, some of the core material will flow or be extruded out between the turns or windings. By a proper conditioning of the core material, tensioning of the winding and spacing of the turns, the outwardly extruded ribs 4 can be caused to protrude through and to a position slightly above the outer surface 5 of the conductor material. Thus right away the turns or windings are insulated from one another.

Should it be decided to go further and provide a complete insulation coating over the surface 5, that can be done in a variety of manners one of which is illustrated in FIG. 4. Here a suitable spray head 6 is shown as projecting a spray 7 of coating material onto the outer surface 5 of the conductor material 2. This spray can if desired be so directed and so coordinated with the winding of the metal strip material 2 that it travels right along the outer surface of that material as the windings are applied, and forms a coating thereon which bridges between the extruded ribs 4. The coating then joins up with those ribs to form, with them, a complete exterior covering for the metal. If merely a single conductor conduit is desired, it is then merely necessary to apply connectors to the metal at the ends and the conduit is completed. Such a conduit, so long as the core and coating are made of suitably elastic material, is highly flexible as well as resistant to vibration and shock, but of particular significance is the fact that it is extensible to 400% of its original length without injuring it or interfering with its electrical functioning.

The formation of a multiple conductor co-axial conduit in keeping with this aspect of the invention is illustrated in FIGS. 2 and 6. Assuming that a single conductor conduit as in FIG. 1 has already been completed or is in the process of being served and has an insulation layer on the outer surface thereof, it is merely necessary to serve another helical winding of strip material 10 right on top of the already completed conductor. This, as shown in FIG. 2 should preferably be wound in the same direction and at substantially the same angle as the initial winding so that they will move together when extension, retraction or other movement of the conduit is effected. As illustrated the windings 11 are shown as proceeding in the same manner as the windings 3 therebeneath.

The strip material 10 may if desired be pre-coated throughout for insulation purposes or may be merely laid on an already cured adhesive layer carried by the under-windings 3. Advantageously it may be insulated from the under layer and have its windings insulated from one another by means of the insulation material applied to the under layer.

Where a two-conductor conduit is being made, and where the current to be carried is insufficient to jump the the gaps between the windings, the serving of non-insulated strip material is all that is necessary. Where, however, insulation of the second conductor is desired or necessary, the application of pre-coated strip material involves nothing more than winding or serving it on as is.

As regards the employment of the insulating coating of the under conductive layer for assisting in insulating the over conductive layers, the preferred procedure is to serve the outer strip material 10 on to the conduit while the insulation layer shown at 13 in FIG. 6 is still somewhat soft and subject to flow. Thus sufficient of it will flow or be extruded out through the spaces or gaps between the turns or windings 11 to insulate those turns from each other. This is shown at 12 in FIG. 6 and as extending out a little beyond the outer surface of the windings 11. Care should be taken, of course, to provide sufficient material in the insulation layer 13 to enable this outward extrusion to take place without reducing the thickness of such layer below that needed to provide effective insulation when the conduit is fully extended.

Once the helical windings 11 have been applied to form the second conductor, full insulation of the outer surface thereof may be completed in suitable manner, such as that of FIG. 4 or otherwise. Then a third co-axial winding may then be applied over the second if desired, following the same procedures. The third or other outer winding, as the case may be, would preferably be left free of any insulating coating on its outer surface for that would not be necessary. Furthermore in the absence of such a coating the outer metal sheathing besides being a conductor would also provide an automatic ground for the conduit.

In the slightly modified form of FIG. 5 the strip material 16 being helically wound on a core 15 is shown as carrying an already applied insulation layer 17 on its outer surface. Obviously a complete insulating sheathing would be provided by a combination of this layer and the outward extrusion of core material between the turns as illustrated at 4 in FIGS. 1, 3 and 6. Hence where suitable thin metal is obtainable from the mill with an elastic insulation coating on one surface thereof, it is merely necessary to shear it into strips and wind the strips onto a core with the insulation already in place on the outer surface of the strip.

Multiple conductor conduits as in the form of FIGS. 2 and 6 can of course be built up employing this pre-insulated material. If it is desired to squeeze some of this insulation out between the turns of an overlying helix for insulating between the edge faces thereof, this can be done by suitably heating and softening the insulation on the underlying metal layers as the overlying layer is being applied.

Another important modification of the invention is illustrated in FIG. 7. Here each conductive layer, instead of being wound in single strip form, is wound as a plurality of parallel strips 21, 22, 23, and 24. These are wound on a suitable extensible elastic core 20 like the core 1 of the FIG. 1 form. If the conduit is to merely include a single conductor, there is no particular necessity for insulation between the strips. Commonly, however, the conduit would be made up of a plurality of concentric conductors wound one on top of the other with insulation therebetween. This insulation can readily be provided in one of the manners heretofore described. In other words, the strips 21 through 24 would be wound on the core 20 while the outer surface of that is sufficiently fluid to have ribs of it extruded or squeezed out at 25 between the windings 26 of the several strips. Following that a complete insulation layer would be applied to the outer surface formed by the strips to join up the ribs 25. Such layer can be applied by spraying, dipping in a bath, or by other suitable applying means.

Additional concentric conductors formed of a similar plurality of parallel strips can be applied over the first conductor and then over the second conductor of subsequent conductors in the manner already described. What is important to note in this construction, however, is that with the use of aluminum for the strips 21, 22, 23 and 24, and the use of all of these strips as a single conductor, the current carrying capacity is multiplied by the number of strips so that a substantial current can be carried by the conductor. Nevertheless, the weight of the conductor and cost of the conductor material are small compared to what the situation would be should the conductors be made out of copper or other more expensive material. The extensibility of a conduit formed of conductors made up of multiple parallel strip elements is just the same as if a single metal strip were applied as illustrated in FIG. 1. Furthermore, the quantity of metal needed per unit length, as against the braided conductors of the prior art, would be a mere fraction.

A further alternative employing aluminum pre-coated throughout is illustrated in FIGS. 8 and 9. Here two parallel strips 31 and 32 are shown as being helically served on to the core 30. It is of course understood that many more such strips in parallel can be wound at once, the two here shown being merely for the purpose of illustration. This particular embodiment however introduces simplification over those previously described inasmuch as insulation of the helical servings is completely effected prior to that serving. This is done by the pre-coating of wide aluminum sheets or strips with extensible insulation material on both sides. In fact this can be done right at the mill as the aluminum sheets are formed. For effective serving, however, the material must be formed into relatively narrow strips as shown at 31 and 32.

In accordance with the invention it has been found that the forming of these coated strips from large coated sheets can be effected while maintaining the insulation on the opposite faces and applying it to the opposed edges. This is done by slitting the material along the line 33 by means of a hot knife, or by a pair of hot knives operating from opposite sides of the sheet. With such knives, preferably heated electrically, and to just the right temperature for the particular coating material, the slitting of the metal can be combined with an instantaneous fusing of the plastic material and a drawing of the fused plastic into the slit past the edge faces. This carries the coating across the edge faces and leaves them with an insulation sheath. Hence each of the strips 31, 32, and so on, is fully sheathed and wholly insulated on both flat faces and edges. This is the form in which it is applied to the core. One effective, tough, abrasion resistant coating and insulating material for this purpose is Mylar, a polyethylene terephthalate marketed by the Du Pont Company of Wilmington, Delaware. Other suitable plastic materials for this purpose will suggest themselves to those skilled in the art and are of course comprehended within the scope of this invention. In FIG. 9 the front and back surface coatings are illustrated at 35 and 36 while the edge coverings are shown at 34.

It will be apparent from the showing of FIGS. 8 and 9 that concentric multiple conductor conduits can be quickly formed by the helical winding of multiple parallel strips of coated aluminum as here shown. Thus, conduits of substantial current carrying capacity, great extensibility, and without limitation as to length, can be quickly and simply formed.

The invention also contemplates the provision of helically wound extensible conduits of substantial strength as illustrated in FIG. 10. Here a core 40 is shown as having elements wound thereon each of which is formed by the helical winding or serving of strips of aluminum as 45, 46, 47 and 48 onto filamentlike members 41, 42, 43, and 44, of textile or rubberlike material. As the windings of these elements are completed, a plurality of them is helically served in parallel on to the core 40 in turns 49, 50, 51 and 52. As here shown no insulation is illustrated between the turns. In certain instances, as already pointed out, this would probably not be necessary but in the event it is necessary it can be effected in any one of the manners heretofore pointed out. Furthermore, if desired, conduits with overlying concentric conductors of the FIG. 10 type can of course be formed by incorporating the FIG. 10 teaching with the provisions for applying insulation coatings of the embodiments heretofore described.

In the foregoing and in the accompanying drawing the showing of multiple conductor conduits has been of the concentric form. It is to be understood of course that multiple conductor conduits in parallel, rather than in concentric form can be made up in accordance with the invention. Furthermore, various combinations of concentric and parallel conduits can be formed as desired.

Though the invention has been described from the standpoint of employing aluminum as the conductor material, and though it is believed that the invention opens up a whole new field for the use of aluminum in electric conduits, particularly extensible ones, it is of course to be understood that the invention is not so limited, copper and other conductor materials of course being usable in place of aluminum. The lengths of conduits to be formed is practically unlimited. Besides that the handling of the conduit or cable is facilitated since it can be wound in a much tighter coil on a drum or reel than is true of prior art conduits. The conduits of the invention will also carry sufficient current so that they can be used for power transmission where there is need for resistance to vibration and shock let alone need for flexibility and extensibility.

The specific materials and procedures for achieving the objective of the invention are to be understood to have been given for illustrative and not limiting purposes. Modifications may be made in the products embodying the invention, in the materials going to make up such products, and in the methods involved without departing from the spirit and scope of the invention. It is accordingly intended that all matter contained in the above description or shown in the accompanying drawing, shall be interpreted as illustrative and not in a limiting sense.

Having described my invention, what I claim is new and desire to secure by Letters Patent is:

An extensible electric cable comprising a cylindrical elastic core, a plurality of smaller elastic cores all arranged as interspersed and parallel helices on the first said core, and a helix of conductive material on each of said smaller cores, said smaller cores all being in concentric relation and having a common diameter in both the normal and stretched conditions of said cable, all of the helices of conductive material having a common direction of turn which is opposite to that of said smaller cores.

References Cited in the file of this patent

UNITED STATES PATENTS

| | | |
|---|---|---|
| 59,318 | Phelps | Oct. 30, 1866 |
| 319,326 | Sawyer | June 2, 1885 |
| 2,002,739 | Herkenberg | May 28, 1935 |
| 2,456,015 | Orser | Dec. 14, 1948 |
| 2,609,417 | Cox et al. | Sept. 2, 1952 |
| 2,764,625 | Ingmanson | Sept. 25, 1956 |

FOREIGN PATENTS

| | | |
|---|---|---|
| 104,401 | Great Britain | Mar. 8, 1917 |
| 418,668 | Great Britain | Oct. 22, 1934 |
| 750,824 | France | June 6, 1933 |
| 813,439 | France | Feb. 22, 1937 |